Figure 1:
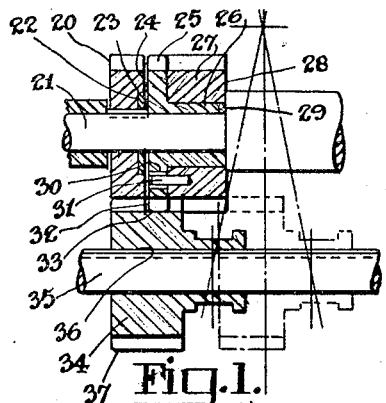

May 24, 1932. J. POTTS 1,859,528

GEAR OR GEARING

Filed Oct. 24, 1929 2 Sheets-Sheet 1

Inventor
James Potts
By B. Singer, atty.

May 24, 1932. J. POTTS 1,859,528
GEAR OR GEARING
Filed Oct. 24, 1929   2 Sheets-Sheet 2
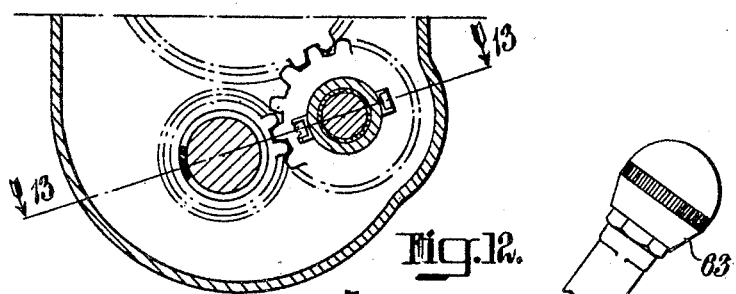
Fig. 12.
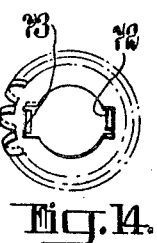
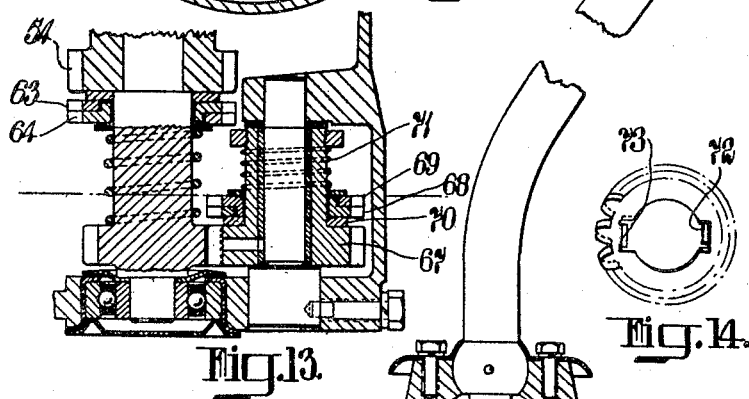
Fig. 13.   Fig. 14.
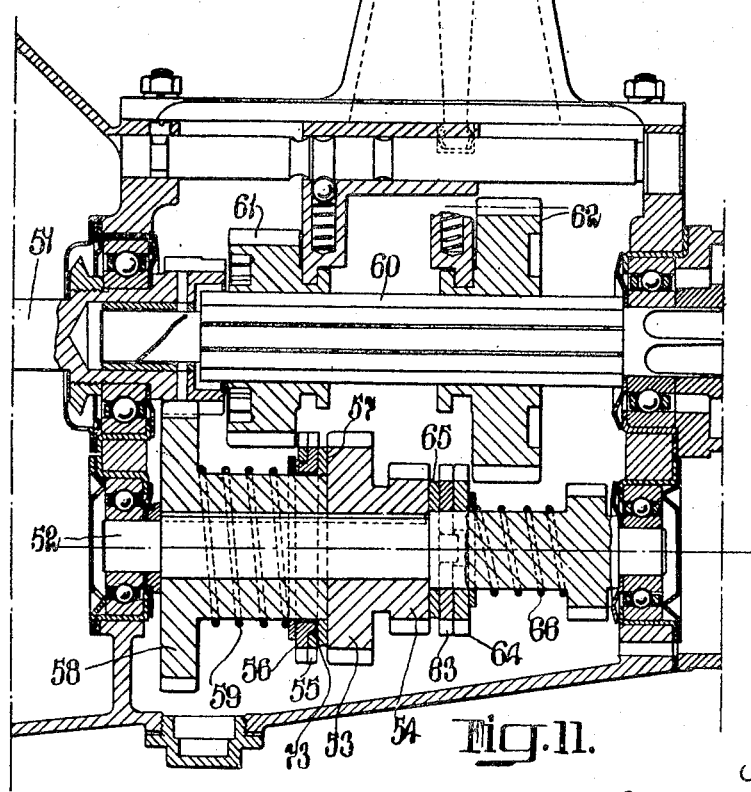
Fig. 11.
Inventor
James Potts
By B. Singer, Atty.

Patented May 24, 1932

1,859,528

UNITED STATES PATENT OFFICE

JAMES POTTS, OF LONDON, ENGLAND

GEAR OR GEARING

Application filed October 24, 1929, Serial No. 402,138, and in Great Britain June 25, 1929.

This invention relates to gears or gearing and has for its object to provide means whereby the teeth of gear wheels are protected when the said wheels are brought into engagement.

In general, gears or gearing constructed according to the invention comprises two intermediate gear wheels adapted to rotate freely on the same axis and so connected that they rotate together with a desired amount of angular play between them. These intermediate gear wheels are mounted axially in front of one of the gear wheels to be engaged (hereinafter called the first main gear wheel) and are so disposed that the teeth of the other wheel to be engaged (hereinafter termed the second main gear wheel) have first to engage with the teeth of the intermediate wheels before passing to the teeth of the first main gear wheel.

Means are provided for frictionally engaging one of the intermediate gear wheels (hereinafter termed the frictional intermediate gear wheel) when required with the first main gear wheel, so that it is caused to turn therewith, whilst the other intermediate gear wheel (hereinafter termed the free intermediate gear wheel) may be in constant mesh with the second main gear wheel or come in a desired position adjacent the said second main gear wheel.

The means for causing the frictional engagement between the frictional intermediate gear wheel and the first main gear wheel may be constantly effective or may be brought into action or enhanced by the movement to engage the main gear wheels, and consequently when it is desired to engage the main gear wheels, the first movement causes the frictional intermediate wheel to turn with and at the same speed as the first main gear wheel. At the same same time the second main gear wheel has engaged or is in engagement with the free intermediate gear wheel. If the consequent speeds of the intermediate gear wheels differ, they therefore will rotate a small angular extent at different speeds so that the teeth of the frictional intermediate gear wheel will form a bar or impediment to the further engaging movement of the second main gear wheel. The parts remain in this condition until the linear speeds of the pitch circles of the main gear wheels become the same, the frictional engagement of the frictional intermediate gear wheel permitting the necessary slip, and at the same time the teeth of the intermediate gear wheels are gradually brought into coincidence permitting the passage of the second main gear wheel to the teeth of the frictional intermediate gear wheel. This last mentioned wheel by its frictional engagement with the first main gear wheel is turned at the same speed as the said first main gear wheel, and consequently the second main gear wheel is free to slide easily into engagement with the first main gear wheel.

Many forms of gears and gearing can be constructed according to the invention, and in most cases it is preferred that the connection between the intermediate gear wheels shall be a pin and slot connection, the slot or slots having a desired circumferential extent, preferably permitting a movement equal to the circumferential pitch between two teeth, although this movement may be less or more as desired.

Where required the entering and exit faces of the teeth of the gears, intermediate or main, may be rounded, especially in the cases of the teeth of the frictional intermediate gear wheel and second main gear wheel.

Suitable friction means such as a ferrodo disc or the like may be provided between the frictional intermediate gear wheel and the first main gear wheel and the intermediate wheels may normally be quite free from axial pressure, so that no frictional engagement takes place.

Axial pressure may be provided by a suitable spring or springs to give a frictional grip, and this may be enhanced or replaced by an axial thrust due to the movement of the second gear wheel by reason of the cam-like action due to the rounded ends of the teeth.

The intermediate gear wheels may be mounted loosely upon the shaft of one of the main gear wheels or upon their own particular shaft, and in some cases one of the intermediate gear wheels, for example the frictional intermediate gear wheel, may be formed with a sleeve, upon which the other intermediate gear wheel is mounted to turn.

In order that the invention may be better understood, it will now be described with reference to the accompanying drawings in which:—

Fig. 1 shews a sectional elevation of one method of carrying the invention into effect.

Figure 2:
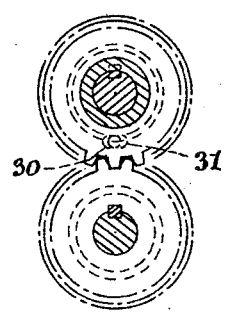

Fig. 2 shews an end elevation of a portion of Fig. 1.

Figure 3:
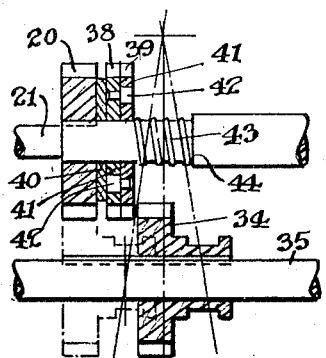

Fig. 3 shews a similar view to Fig. 1, of another method of carrying the invention into effect.

Figure 4:
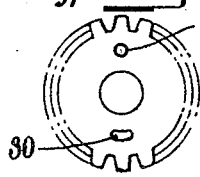
Figure 5:
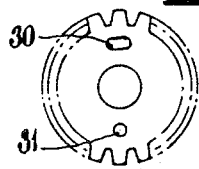

Figs. 4 and 5 shew elevations of detached details.

Figure 6:
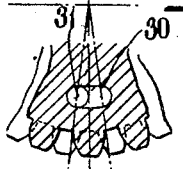
Figure 7:
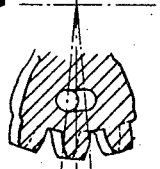

Figs. 6 and 7 shew fragmentary views illustrating the action of certain parts.

Figure 8:
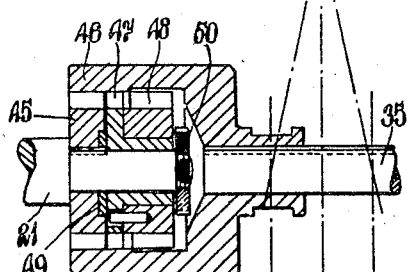
Figure 9:
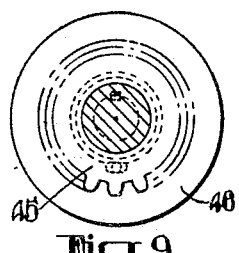

Fig. 8 shews a sectional elevation and Fig. 9 an end view of another method of carrying the invention into effect.

Figure 10:
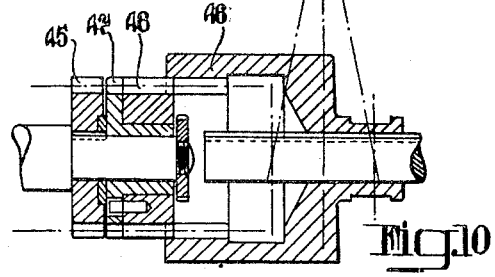

Fig. 10 shews a similar view to Fig. 8 with the parts in another position.

Fig. 11 shews a sectional elevation through the gear box of a motor car, with the invention applied to certain of the gears thereof.

Fig. 12 shews a sectional side elevation of a portion of Fig. 11 to illustrate the reverse drive.

Fig. 13 shews a fragmentary sectional elevation on the line 13—13, Fig. 12.

Fig. 14 shews in elevation gear details associated with the form of the invention shewn in Figs. 11 to 13.

The particular form of gear constructed according to the invention and shewn in Figs. 1 and 2 comprises a first main gear wheel 20 mounted upon and keyed to a shaft 21. This gear wheel 20 is recessed at 22 on one face and has located in the recess a ring 23 of ferrodo or other suitable frictional material, the outer surface of which projects beyond the surface 24 of the gear wheel 20. The shaft 21 extends beyond this frictional ring 23 and has mounted thereon a frictional intermediate gear wheel 25. This has the same number of teeth and diameter as the main gear wheel and is formed with a sleeve 26. The free intermediate gear wheel 27 is mounted upon the sleeve 26 and this again has the same diameter and number of teeth as both the frictional intermediate wheel 25 and the first main wheel 20. The outer surface 28 of the free intermediate wheel 27 comes flush with the end of the sleeve 26 and the shaft 21 is shouldered at 29 to form a stop or abutment to hold the intermediate wheels 25 and 27 in position, whilst permitting them a slight amount of axial play to enable the frictional intermediate wheel 25 to come out of engagement with the ring 23 of ferrodo or other material. The frictional intermediate gear wheel 25 is provided with one or more slots 30 of desired circumferential extent and the free intermediate gear wheel 27 has a corresponding number of pins 31 which enter the said slots 30. The amount of circumferential movement permitted between the two intermediate wheels 25 and 27 is substantially the pitch distance between the teeth of the gears. The teeth at the entry faces of the frictional intermediate gear 25 and the first main gear 20 are rounded at 32 and 33 respectively.

The second main gear wheel 34 is mounted to turn with a shaft 35 parallel to the first shaft 21 and is adapted to move axially, either by axial movement of the said shaft or by sliding upon a featherway or the like 36 upon the said shaft. This second main gear wheel 34 normally runs in mesh with the free intermediate gear wheel 27 (in the position shewn dotted in Fig. 1) and the entry faces of its teeth are rounded at 37.

In action, in order to engage the main gear wheels 20 and 34, the second main gear wheel 34 is slid until the rounded ends 37 of its teeth press against the rounded ends 32 of the teeth of the frictional intermediate gear wheel 25. This action causes frictional grip between the frictional intermediate gear 25 and the first main gear 20. The frictional intermediate gear 25 is then subjected to two forces (1) the turning movement of the first main gear 20, and (2) the turning movement due to the axial thrust of the second main gear 34. If the linear speeds of the pitch circles of the main gears 20 and 34 are exactly the same, then the two intermediate gears 25 and 27 are rotated at the same speed, and the axial thrust of the second main gear 34 brings the gaps in the teeth of the intermediate gears into alignment by the interaction of the rounded cam-like ends 37 and 32 so that further axial movement of the second main gear is permitted, to enable its teeth to mesh with those of the frictional intermediate gear 25. The rounded ends 37 of the second main gear 34 and 33 of the first main gear 20 now come adjacent and as the gears are rotating with their pitch circles at the same linear speeds, the curved ends permit easy engagement between the main gears.

If, however, the linear speeds of the pitch circles of the main gears differ, then the two turning movements acting upon the frictional intermediate gear 25 cause relative movement to take place between the two intermediate gears, which is permitted by the slots and pins 30 and 31, the direction of the relative movement varying according to which of the main gears has the greater linear speed, and this brings the teeth of each intermediate gear wheel opposite to the spaces between the teeth of the other intermediate gear wheel and the pins 31 to one end or other of the slots 30. Thus the second main gear wheel cannot come fully into mesh with the frictional intermediate gear wheel 25 and in this manner the second main gear wheel is held from being brought into mesh with the first main gear wheel.

When the load or the drive, as the case may be, is so altered that the linear speeds of the pitch circles of the main gear wheels become the same or substantially the same, then the thrust of the teeth of the second main gear wheel 34 on the frictional intermediate wheel 25, acting as before in a cam-like manner, causes the said frictional intermediate gear wheel to be turned relatively to the free intermediate gear wheel 27 (removing the pins 31 from the ends of the slots to an intermediate position) to bring the gaps in the teeth between the intermediate gear wheels into alignment. In this manner as before explained axial movement of the second main gear wheel can be continued until the main gears come into mesh.

As in the form of the invention shewn in Figs. 1 and 2, even when the second main gear wheel is in engagement with the first main gear wheel the said second main gear wheel 34 still remains in mesh with the free intermediate gear 27, it will be understood that no difficulty is experienced in disengaging the gear 34 from the gear 20.

Figs. 4 and 5 shew face views of the intermediate gear wheels such for example as 25 and 27, each having a slot 30 and a pin 31 and so disposed that the pin 31 of one gear can enter the slot 30 of the other gear.

Figs. 6 and 7 illustrate how the teeth of one intermediate gear project over the gaps between the teeth of the other gear when the pin 31 is brought to the end of the slot 30. In Fig. 6 it will be seen that when the parts are in this position the gaps in one gear wheel are fully covered by the teeth of the other gear wheel, whilst in Fig. 7 in the corresponding position the gaps are only partly obscured by the teeth. In either case the position is such that when the pins 31 are in an intermediate position in the slots 30 the gaps of both intermediate gear wheels are in coincidence.

According to another and somewhat similar form of the invention, shewn in Fig. 3, the frictional and free intermediate gears 38 and 39 respectively are made the same and they are both loosely mounted upon the shaft 21 of the first main gear 20, a ring 40 of ferrodo or other suitable material being mounted around the shaft between the first main gear 20 and the frictional intermediate gear 38 coming adjacent thereto. Each intermediate gear has a circumferential slot 41 of desired extent, and in a diametrically opposite position a projecting pin 42, the arrangement being similar to that shewn in Figs. 4 and 5. By this means when the intermediate gears are mounted upon the shaft the pin 42 of one comes into the slot 41 of the other. The entry and exit faces of the teeth of both intermediate gears are rounded and a compression spring 43 is provided upon the shaft 21, abutting at one end against a shoulder 44 thereon, and at the other end against the free intermediate wheel 39, to keep these gears 39 and 38 pressed towards the first main gear, 20.

The second main gear 34 in this case has its teeth rounded at each end and normally is not in engagement with the free intermediate gear 39 (as shewn in full lines in Fig. 3), but when it is desired to engage the main gears, the first movement brings the second main gear 34 into engagement with the teeth of the free intermediate gear 39 and then the action is similar to that previously described.

In either case when in engagement with the first main gear 20, the second main gear 34 may be free of the teeth of the intermediate gears or may still be in engagement therewith. When, however, the arrangement is such that the second main gear 34 is free, the exit faces of the teeth of the gears 34, 38 and 39 must be rounded to permit the ready disengagement of the main gears.

In some cases one of the main gear wheels may be an internal clutch member, such as an internally toothed annulus but it will be realized that the action will be the same as that previously described, especially if the intermediate clutch members are associated with the other main clutch member wheel. In such constructions the free intermediate clutch member may be in mesh with the annulus, when the main clutch members are out of engagement, or otherwise, as desired.

In a preferred case with such a construction and as shewn in Figs. 8, 9 and 10, the first and second main clutch members 45 and 46 have the same number of teeth and diameter. In this instance the shafts 21 and 35 come in alignment and when the main clutch members are in engagement the two shafts drive solid, but as will be understood the said clutch members can only be brought into engagement through frictional and free intermediate clutch members 47 and 48 respectively, and then only when the speeds of the respective shafts are the same.

In the arrangement shewn in Figs. 8, 9 and 10, the frictional and free intermediate clutch members are shewn constructed and interconnected in a manner similar to those illustrated in Fig. 1, and a friction disc 49 is disposed in a recess in one face of the first main clutch member 45, so that it projects therefrom to engage with the adjacent face of the frictional intermediate clutch member 47. The intermediate clutch members are maintained in position on the shaft 21 by means of a nut device 50 which forms an abutment, permitting very slight axial play.

The disengaged position of the main clutch members is shewn in Fig. 10 and from this figure it will be seen that in the disengaged position the second main clutch member 46 remains in mesh with the free intermediate clutch member 48. If desired, however, the arrangement may be such that in the disengaged position of the main clutch members, the second main clutch member 46 comes out of engagement with the free intermediate clutch member 48. Whatever the arrangement, however, it should be noted that where required the ends of the teeth of any of the clutch members may be rounded to facilitate the engagement of other gears.

Fig. 8 shews the main clutch members in engagement, and it will be appreciated from this figure that the whole device, including the shafts and all the clutch members, rotates solid.

It should in all cases be understood that the teeth of the intermediate gear wheels are so disposed relatively to their interengaging means and to each other, that when the said wheels in either direction have reached their extreme relative positions, then the teeth on te free intermediate gear wheel, bar or partially bar the gaps between adjacent teeth of the frictional intermediate wheel. In this manner when the intermediate gear wheels are rotating at different speeds from the first main gear wheel, then the teeth of the frictional intermediate gear wheel are displaced in relation to the teeth of the free intermediate gear wheel, thus preventing the second main gear wheel, which is driving the intermediate gear wheels, from sliding into engagement with the first main gear wheel, until the first main gear wheel is rotating at the same speed as the intermediate gear wheels, or preferably a little faster. The natural drag thus causes the frictional intermediate gear wheel to move in relation to the free intermediate gear wheel until the teeth are opposite to one another, when the second main gear wheel can be moved into engagement with the first main gear wheel, by passing through the teeth of the frictional intermediate gear wheel.

The slot and pin, or other equivalent connecting means between the intermediate gear wheels may be arranged so that displacement can take place in either direction, or in one direction only as desired.

Referring to Figs. 11 to 14; in these figures a practical application of the invention is shewn, comprising various pairs of first and second main gears, with associated frictional and free intermediate gears, as utilized in the gear box of a motor road vehicle.

In Fig. 11, 51 is the engine shaft which drives through gearing in the usual manner a counter shaft 52, which counter-shaft has keyed thereto first main gear wheels 53 and 54. Associated with the first main gear wheel 53 is a pair of intermediate gear wheels comprising a frictional intermediate gear 55 and a free intermediate gear 56, a ring of friction material 57 being disposed between the face of the frictional intermediate gear 55 and the adjacent face of the first main gear 53. The intermediate gear wheels 55 and 56 and the friction ring 57 are mounted around the boss of a gear wheel 58 on the countershaft 52 and are kept pressed towards the first main gear 53 by a helical compression spring 59.

60 is the driven shaft having splined thereon slidable second main gears 61 and 62, which are adapted to be moved axially from the gear lever 63 in a well known manner. The second main gear 61 forms the gear to be associated with the first main gear 53, and for this purpose the intermediate gears 55, 56 are located in a position intermediate the main gears 53 and 61, the action being similar to that explained with reference to Figs. 1 and 2 or 3.

Associated with the first main gear 54 is a pair of intermediate gears, comprising a frictional intermediate gear 63 and a free intermediate gear 64 mounted freely on the shaft 52, with a ring of friction material 65 between the intermediate gear 63 and the first main gear 54. The gears 63, 64 and the ring 65 are kept pressed towards the first main gear 54 by a compression spring 66 mounted around the shaft 52.

The second main gear 62 slidable on the shaft 60 is adapted to co-operate with the first main gear 54 with the intervention of the intermediate gears 63, 64 in a manner as previously explained.

The invention is also applied to the reverse drive as shewn in Figs. 12 and 13, by associating with the first main gear 67 comprised by the reverse pinion, a pair of intermediate gear wheels 68 and 69, 68 being the frictional gear wheel and 69 the free gear wheel, having associated therewith a ring of friction material 70, the whole being mounted freely upon the boss of the gear 67 and kept pressed towards the said wheel by a compression spring 71, the gear 62 acting as the second main gear for the reverse drive.

In the drawings, the intermediate gears are connected together, in order to have the desired small amount of relative angular movement, by forming each gear with a recess or notch 72 opening into its central bore, and with a pressed up or turned round tongue 73 in a diametrically opposite position, the arrangement being such that the pressed up tongue 73 of one of the intermediate gears enters into the recess 72 of the other associated intermediate gear, the circumferential extent of the recess 72 being a desired amount greater than the circumferential extent of the tongue 73.

In the embodiment shewn in Figs. 11, 12, 13 and 14, the invention is shewn applied to the bottom, second and reverse gears, but not to the top gear which is of ordinary construction, but it will be realized that the top gear can be formed in a manner similar to that shewn and described with respect to Figs. 8, 9 and 10, if desired, and by this means when in top gear the shaft 35 is driven at the same speed and solid with the shaft 21.

In some cases spring or other means may be employed normally to keep the teeth of the intermediate gear wheels in line, until relative circumferential movement causes the said teeth to be relatively displaced.

Where a spring is employed for creating initial friction between the frictional intermediate gear wheel and the first main gear wheel, the arrangement of this spring can be varied as desired, as well as its pressure. In the case of change speed gears for machine tools, or for other purposes, where the changing may take place under no load and where no clutch is employed, the friction created by the spring may cause the intermediate gears to synchronize in speed and enable the second main gear to travel into mesh.

Gears and gearing constructed according to the invention are particularly suitable for application to the gear boxes of motor vehicles and one such constructional embodiment has been described, but many other constructional forms can be utilized according to the particular nature of the gear box. Further, in all cases any number of gear protecting arrangements according to the invention may be used, depending upon the particular circumstances in any gear combination.

The two intermediate gears can be arranged either on the driving or driven shafts, and may be arranged to slide with the gear moving into mesh or may be arranged in front of the fixed main gear to be engaged.

The invention is not limited to the precise forms or details of construction described, as these may be varied to suit particular cases.

What I claim and desire to secure by Letters Patent of the United States of America is:—

1. Automatic means for protecting the teeth of two main toothed gear wheels (termed the first and second main gears) which are to be brought into engagement by relative axial movement, comprising two coaxial intermediate toothed gear wheels (termed the friction and free intermediate gears) each having the same diameter and number of teeth, which teeth are suitable to be engaged by the teeth of the second main gear, interconnecting means between the friction and free intermediate gears including a lost motion device, so that the said intermediate gears are adapted to rotate together but with a limited amount of angular play between them, friction means, brought into operation or enhanced by the first part of the movement to engage the two main gears, adapted to rotate the friction intermediate gear from and in the same direction as the first main gear, the free intermediate gear being relatively moved in mesh with the second main gear by initial movement to engage the main gears, so that it is rotated by the second main gear in the same direction as the friction intermediate gear driven by the first main gear, the arrangement being such that, when the main gears are relatively moved towards their engaging position, if the linear speeds of the pitch circles of the main gears are the same no relative rotary movement takes place between the intermediate gears, and the second main gear is free to be relatively moved successively into engagement with the friction intermediate gear and then into engagement with the first main gear, but if the said linear speeds vary, the permitted limited amount of relative rotary movement occurs between the intermediate gears and the teeth of the friction intermediate gear are caused to project over the gaps between the teeth of the free intermediate gear.

2. Automatic means for protecting the teeth of two main toothed gear wheels, as claimed in claim 1, in which the connection including a lost motion device permitting a limited amount of angular play between the intermediate gears comprises one or more projections carried by one of the intermediate gear wheels, which project into one or more circumferential slots in the other said intermediate gear, the said slots permitting circumferential movement over the projections up to half the pitch of the teeth of the intermediate gears.

3. Automatic means for protecting the teeth of two main toothed gear wheels, as claimed in claim 1, in which spring means are employed normally to keep the teeth of the intermediate gears in line, for the purposes set forth.

In witness whereof I affix my signature.

JAMES POTTS.